Feb. 23, 1971   J. L. SHANAHAN   3,565,546
WIND MOTOR
Filed July 31, 1969   3 Sheets-Sheet 2
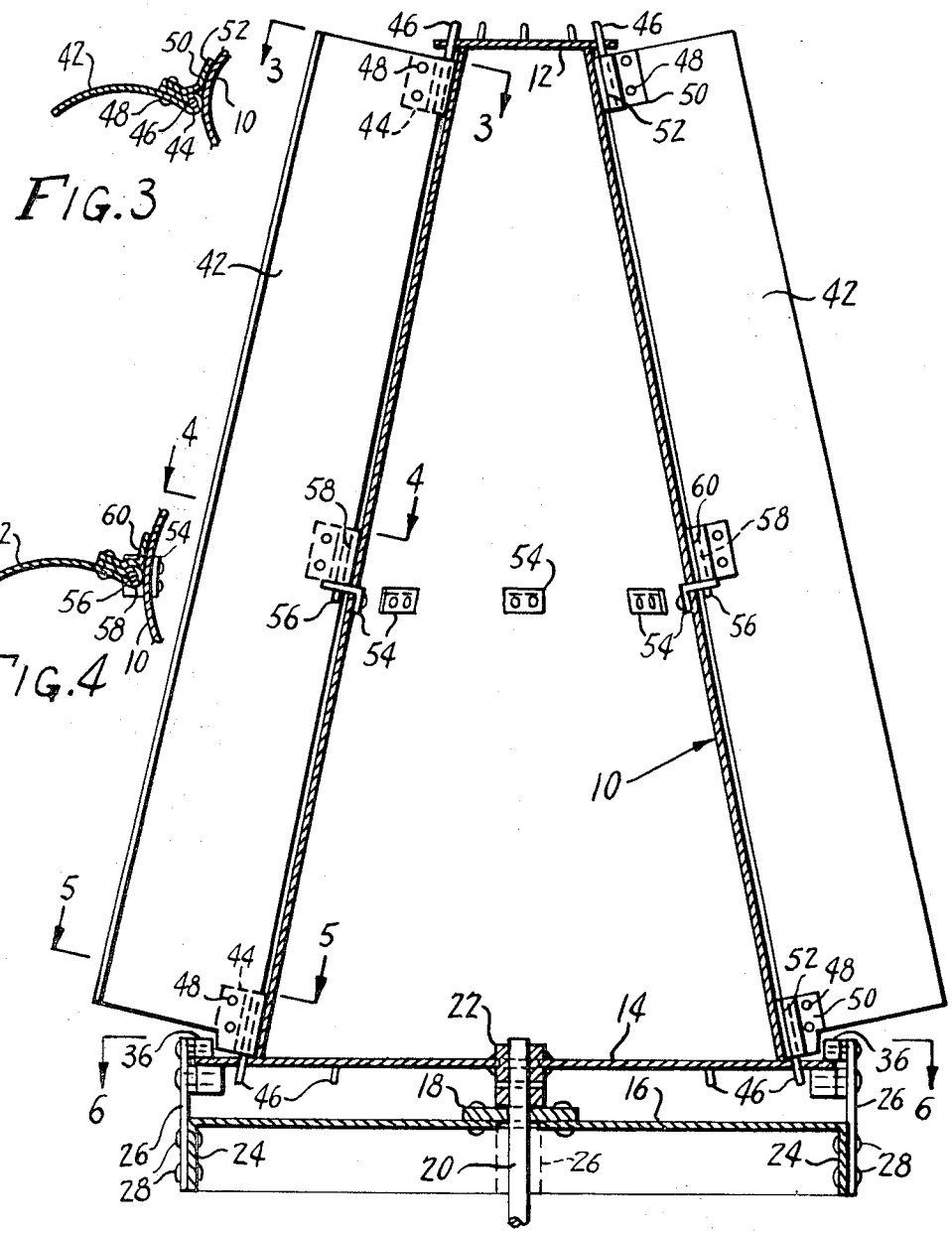
INVENTOR.
JOHN L. SHANAHAN
BY
*Victor J. Evans & Co.*
ATTORNEYS.

Feb. 23, 1971   J. L. SHANAHAN   3,565,546
WIND MOTOR

Filed July 31, 1969   3 Sheets-Sheet 3

INVENTOR.
JOHN L. SHANAHAN
BY
Victor J. Evans & Co.
ATTORNEYS.

United States Patent Office 3,565,546
Patented Feb. 23, 1971

3,565,546
WIND MOTOR
John L. Shanahan, 380 W. Main St.,
Waterbury, Conn. 06702
Filed July 31, 1969, Ser. No. 846,367
Int. Cl. F03d 3/00
U.S. Cl. 416—117                                          9 Claims

ABSTRACT OF THE DISCLOSURE

A hollow truncated body of circular cross section throughout its height is provided at spaced points therearound with vanes adapted to swing freely outwardly to transmit wind power to the body at one side thereof and to fold into proximity to the other side of the body to substantially eliminate the transmission of any rotational force to the body. Outward swinging movement of the vanes is limited by resilient means adapted to "give" under high wind velocities to "spill" some of the wind from the vanes and thus prevent damage to the parts. The body is adapted to transmit rotational forces to an axial power takeoff shaft at the bottom thereof.

BACKGROUND OF THE INVENTION

The invention relates to the field of wind motors and is adapted to utilize the force of the wind to perform useful work. In prior devices of this general type, it has been necessary to provide internal or external supporting structures to brace them against the force of the wind, or to use guy wires or similar expedients. Such structures are relatively cumbersome and expensive to manufacture and erect.

SUMMARY OF THE INVENTION

The device comprises a hollow relatively light body which is vertically elongated and of closed cross section, and preferably of circular cross section throughout its height. In practice, the most efficient form of the body is a truncated cone, the bottom of which is fixed to a plate to which is secured a downwardly projecting axial power takeoff shaft. At spaced points around the sides of the body are arranged pivoted vanes adapted to swing into closed proximity to the body by the force of wind acting thereagainst at one side of the body, while the wind catches the vanes at the opposite side of the body to swing them outwardly to be subjected to the force of the wind to rotate the body and thus transmit power through the takeoff shaft.

The bottom plate of the body is horizontal and is supported against any tilting movement by bearing means and preferably antifriction rollers so that wind force acting against the cone cannot tip the plate, and the body accordingly is maintained at all times in its proper vertical position. The truncated conical shape of the body is important. The wider end is at the bottom and fixed to the supporting plate, which is of substantial size and acts between the antifriction bearings referred to to provide strong bracing against the tipping of the body under wind pressures acting thereagainst. The tapering of the body to decrease in diameter toward its upper end progressively reduces wind pressures acting thereagainst to reduce the tilting moment of the body, thus rendering the antifriction bearings highly efficient for maintaining the base plate in its horizontal position. Moreover, the conical shape of the body renders it inherently strong as well as simple and does away with the need for an internal tower support or external bracing. Also, it gives the base a wide distribution of weight and resistance to tilting movement.

Each vane is provided with means for limiting its outward tilting movement under the influence of the wind. This means for limiting such movement is strong but preferably resilient so as to "give" under the force of high velocity winds so that the active vanes may swing beyond their normal operative positions to "spill" some of the wind and thus eliminate the absorption of destructive forces.

BRIEF DESCRIPTION OF THE DRAWINGS

FIG. 2 is a vertical axial sectional view on line 2—2 of FIG. 1;
FIG. 3 is a detail section on line 3—3 of FIG. 2;
FIG. 4 is a similar view on line 4—4 of FIG. 2;
FIG. 5 is a similar view on line 5—5 of FIG. 2.

DESCRIPTION OF THE PREFERRED
EMBODIMENT

Figure 1:
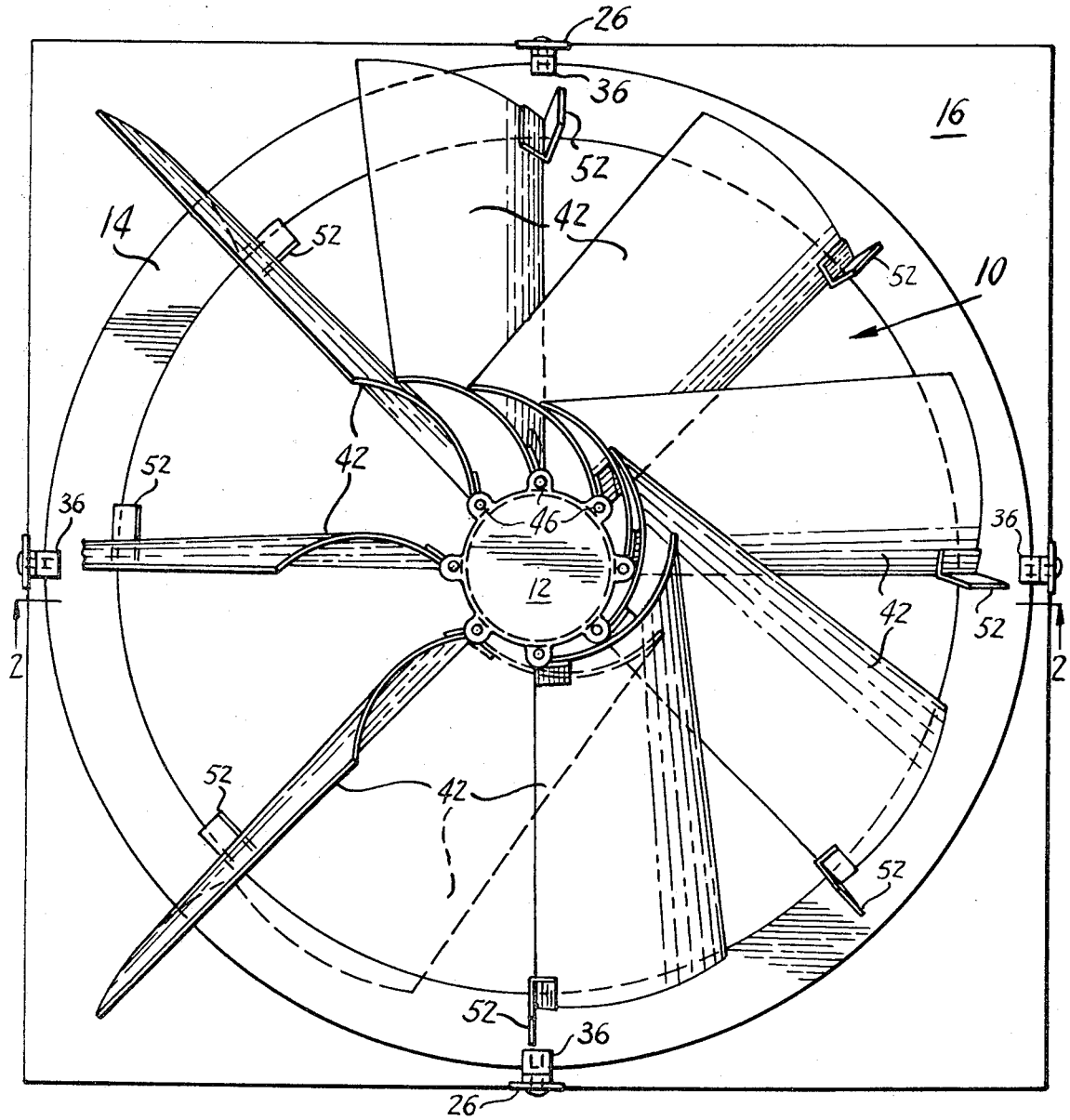
FIG. 1 is a plan view of the device.
Figure 6:
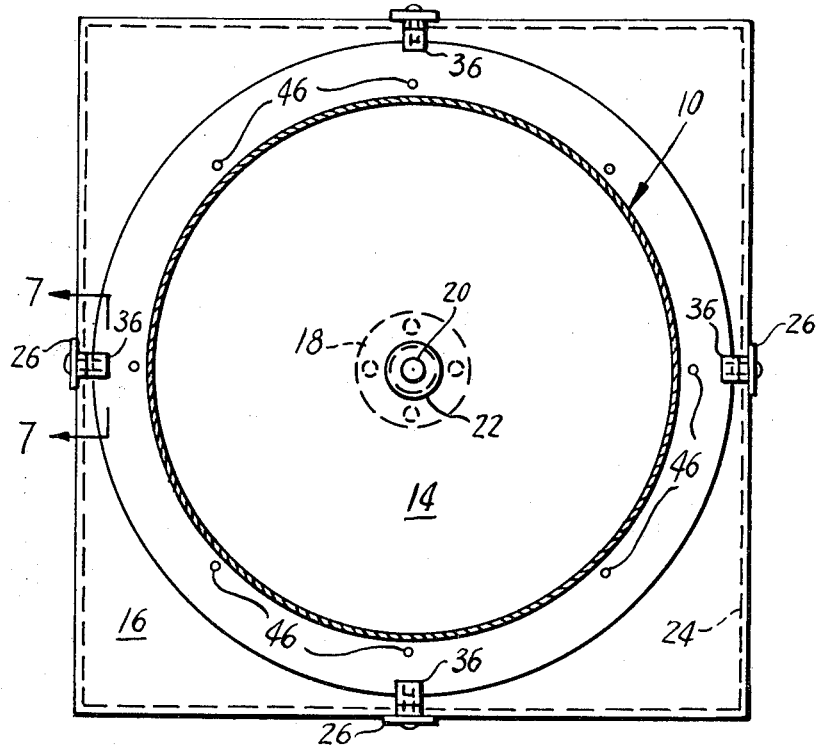
FIG. 6 is a horizontal section on line 6—6 of FIG. 2.

Referring to FIGS. 1 and 2 the numeral 10 designates the body of the device which is in the form of a hollow truncated cone formed of any suitable material possessing the necessary degree of strength while being made as light as possible. The upper end of the body is closed by a plate 12 which may be welded thereto, and is closed at the bottom by a base plate 14 extending beyond the horizontal limits of the body as shown in FIG. 2. The plate 14 is welded or otherwise secured to the body and spaced therebelow is a base plate 16 carrying an axial bearing 18 in which is mounted a power takeoff shaft 20 fixed to an upper collar 22 which, in turn, is fixed to the plate 14. The base plate 16 is provided with a downturned flange 24 at its periphery, adapted to rest on or be secured to a suitable supporting surface.

Figures 7, 8:
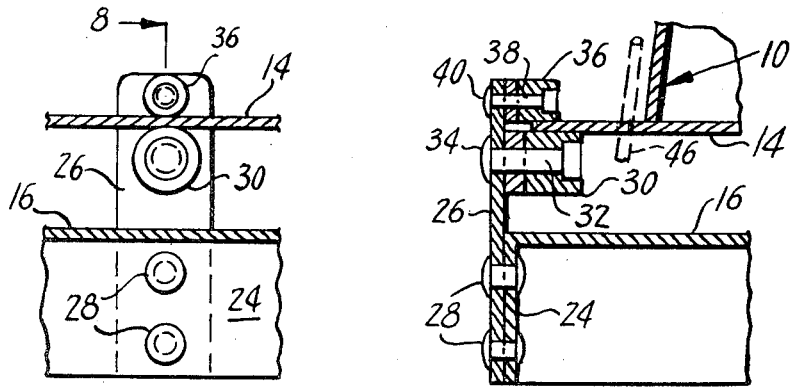
FIG. 7 is a detail fragmentary section on line 7—7 of FIG. 6.
FIG. 8 is a similar view on line 8—8 of FIG. 7.

At spaced points therearound, the flange 24 is provided with plates 26 riveted or otherwise secured thereto as at 28 and extending upwardly beyond the plate 14. The plates or brackets 26 support rollers 30 (FIG. 8), preferably of the antifriction type and mounted on shafts 32 secured as at 34 to the plates 26. The plate 14, carrying the weight of the body 10 and other elements to be described, is supported on the rollers 30. Similar rollers 36, mounted on shafts 38 fixed as at 40 to the upper ends of the plates 26, are adapted to lightly contact the top surface of the plate 14 near its periphery. Accordingly, it will be apparent that any wind pressure acting against the body 10 and associated elements will generate a force tending to tip the body 10 and plate 14, and such force is absorbed by the rollers 30 and 36.

Around the body 10 is arranged a plurality of elongated vanes 42. These vanes are preferably, but not necessarily, eight in number as shown in FIG. 1. At the top and bottom thereof, each vane is provided with an extension bent around upon itself as at 44 (FIGS. 3 and 5) to receive a hinge pin 46, these pins at the top and bottom of the body projecting through and being rotatable relative to the respective plates 12 and 14. The hinge-forming portion of each vane has its free end riveted to the body of the vane as at 48 and these rivets also extend through angular stop members 50 having inner end portions 52 bent angularly and curved to conform to the curvature of the body 10 where they are adapted to contact therewith as described below. The stop members 50 are preferably formed of spring steel, for a reason which will become apparent.

For a wind motor of any substantial height, it is preferable that hinges and stop members be provided intermediate the height of the body or at spaced points vertically therealong. In FIGS. 2 and 4, the body is shown as being provided with brackets 54 each having an arm projecting through the body 10 and carrying a pivot pin 56 projecting through a hinge member 58 formed on each vane in the same manner as the hinge members 44. Each of the hinge members 58 also carries one of the spring steel stop members 60 engageable with the body 10 (FIG. 4). Each vane is transversely curved from its inner to its outer edge, and the degree of curvature preferably slightly progresses from the bottoms to the tops of the vanes which will be apparent from the comparison of FIGS. 3, 4 and 5.

OPERATION

In looking at the plan view in FIG. 1, it will be apparent that each vane is adapted to swing freely in a clockwise direction about its hinge pins from the operative positions shown at the left side of FIG. 1 to the inoperative positions at the right side of FIG. 1. Assuming that the wind is blowing from the direction of the bottom of FIG. 1 upwardly, the wind will catch beyond those vanes to the left of the axis of the device, and such vanes will swing outwardly into the wind to be subjected to the force thereof. At the opposite side of FIG. 1, the wind will move the vanes inwardly in proximity to the body. It is not necessary or advisable that the vanes fold inwardly entirely into contact with the body since it is desirable that they project out somewhat so as to be caught by the wind and swing outwardly at the opposite side of the device. As a matter of fact, the widths of the vanes will be such that they will overlap adjacent the top of the device as shown in FIG. 1.

The force of the wind against the operative vanes will generate a torque on the body 10, rotating it and consequently rotating the shaft 20 for the performance of useful work. As the vanes approach the top of FIG. 1, the wind will swing the vanes inwardly, while those passing the bottom of FIG. 1 will be successively caught by the wind and swung outwardly to torque-generating positions.

As stated, the stop members 50 and 60 are formed of resilient steel and in average winds, these stop members will not be flexed. However, if winds become so excessive that damage might result to the parts of the apparatus, the resilient stop members will "give," thus permitting the operative vanes to swing somewhat beyond operative position to "spill' air therefrom and thus prevent damage to the parts.

The force of the wind acting against the operative vanes and the body 10 obviously will tend to tilt these elements from their normal positions together with the plate 14. Such tilting movement of the plate 14 is prevented by the rollers 30 and 36. For example, if the wind is blowing from the left in FIG. 2, there will be a tendency for the upper end of the body 10 to swing to the right, and the corresponding side of the plate 14 will bear upon and be effectively supported by the associated roller 30. The upward force at the oposite side of the plate 14 will be absorbed by the left-hand roller 36 as viewed in FIG. 2. Thus the plate 14 will be effectively held under all conditions in horizontal position and negligible friction will be introduced into the apparatus by the rollers 30 and 36. Moreover, damage to the parts is prevented, including the transmission of any bending force to the shaft 20.

The use of a truncated cone as the body 10 is important for several reasons. The size of the bottom of the body is such that any tilting forces will be solidly transmitted at points widely spaced from the axis of the device against the plate 14. In this connection, the arrangement of the antifriction rollers outwardly of the body renders them highly effective in preventing any tilting of the plate 14. Moreover, by tapering the body 10 to decrease its diameter upwardly progressively reduces toward the top of the body, wind forces acting against the body. It also will be noted that the truncated conical body possesses a high degree of strength to resist any bending or distortion of the parts.

The entire structure is simple and economical to make and is easily assembled as to all of its parts. Moreover, the operation is positive and all parts are protected from damage due to high velocity winds. It is unnecessary to provide any internal or external bracing of any kind since the body 10 and associated elements coact to provide their own bracing and stiffening action.

From the foregoing it will now be seen that there is herein provided an improved wind motor which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I claim:

1. A wind motor comprising a horizontal rotatable plate, a hollow body carried by said base and projecting upwardly therefrom, said body decreasing in diameter toward its upper end, a plurality of vanes spaced circumferentially around said body and pivoted thereto to swing outwardly at one side of said body and inwardly at the other side depending upon the direction of the wind, and means for limiting outward swinging movement of said vanes.

2. A wind motor according to claim 1 wherein said means for limiting outward swinging movement of said vanes is resilient to permit outwardly swung vanes to move appreciably beyond their normal outward positions to "spill" wind from the vanes to prevent the absorption of destructive forces by said vanes and the transmission of destructive forces to said body.

3. A wind motor according to claim 1 provided with bearing means to prevent tilting movement of said plate out of its normal horizontal position.

4. A wind motor according to claim 3 wherein said means for limiting outward movement of said vanes is resilient to permit outwardly swung vanes to move appreciably beyond their normal outward limits to "spill" wind from the vanes to prevent the absorption of destructive forces by said vanes or the transmission of destructive forces to said body.

5. A wind motor according to claim 1 wherein said plate projects horizontally beyond the bottom of said body, and bearing means engaging the projecting edge of said plate above and below the same to prevent the tilting of said plate out of its normal horizontal position, and a power takeoff shaft fixed axially to said plate and projecting therebelow.

6. A wind motor according to claim 5 wherein said bearing means comprise radial rollers engaging the projecting portions of said plate respectively against the top and bottom faces thereof.

7. A wind motor according to claim 6 provided with a base plate, a bearing carried by said base plate and through which said takeoff shaft projects, and means carried by said base plate for supporting said radial rollers.

8. A wind motor according to claim 1 wherein said means for limiting outward swinging movement of said vanes comprises a plurality of resilient angular plates engaging respectively between said body and said vanes when the latter are swung outwardly and adapted to be flexed out of their normal shapes to permit said vanes to swing appreciably beyond their normal outward positions to prevent the absorption of destructive forces by said vanes and the transmission of destructive forces to said body.

9. A wind motor according to claim 8 wherein said resilient angular plates each is provided with one leg fixed to the associated vane and a second leg engageable against said body when each vane reaches its normal outward position.

References Cited
UNITED STATES PATENTS

| | | | |
|---|---|---|---|
| 924,909 | 6/1909 | La Bauve | 416—119 |
| 1,139,103 | 5/1915 | Clade | 416—119 |
| 1,315,692 | 9/1919 | Weed | 416—119 |

EVERETTE A. POWELL, JR., Primary Examiner